United States Patent
Sturm

(10) Patent No.: US 10,822,843 B2
(45) Date of Patent: Nov. 3, 2020

(54) MOTOR VEHICLE LOCK

(71) Applicant: Kiekert AG, Heiligenhaus (DE)

(72) Inventor: Christian Sturm, Krefeld (DE)

(73) Assignee: Kiekert AG, Heiligenhaus (DE)

( * ) Notice: Subject to any disclaimer, the term of this patent is extended or adjusted under 35 U.S.C. 154(b) by 676 days.

(21) Appl. No.: 15/541,036

(22) PCT Filed: Dec. 9, 2015

(86) PCT No.: PCT/DE2015/100526
§ 371 (c)(1),
(2) Date: Jun. 30, 2017

(87) PCT Pub. No.: WO2016/116082
PCT Pub. Date: Jul. 28, 2016

(65) Prior Publication Data
US 2018/0016822 A1 Jan. 18, 2018

(30) Foreign Application Priority Data

Jan. 20, 2015 (DE) .......................... 10 2015 100 750

(51) Int. Cl.
*E05B 79/20* (2014.01)
*E05B 81/40* (2014.01)
(Continued)

(52) U.S. Cl.
CPC .............. *E05B 81/25* (2013.01); *E05B 79/20* (2013.01); *E05B 81/40* (2013.01);
(Continued)

(58) Field of Classification Search
CPC ...................................................... E05B 81/40
See application file for complete search history.

(56) References Cited

U.S. PATENT DOCUMENTS 2,753,202 A * 7/1956 Smith .................... B60J 7/1851
292/251
4,266,437 A * 5/1981 Obergfell ............ F16H 25/2015
74/89.37
(Continued)

FOREIGN PATENT DOCUMENTS

CN 102105647 6/2011
DE 10203385 8/2003
(Continued)

OTHER PUBLICATIONS

Partial Machine Translation of International Search Report submitted by Applicant dated Jun. 30, 2017 (Year: 2015).*
(Continued)

*Primary Examiner* — Howard J Sanders
*Assistant Examiner* — Gregory T Prather
(74) *Attorney, Agent, or Firm* — Renner, Otto, Boisselle & Sklar, LLP

(57) ABSTRACT

The invention relates to an actuating unit (14) having an actuating element (15), in particular to a closing drive for a motor vehicle lock, comprising a drive unit, a housing (18, 19), a spindle nut (16), and a spindle (15), wherein the spindle nut (16) is accommodated in the housing (18, 19) of the actuating unit (14), and a Bowden cable (20), wherein the Bowden cable (20) is connected to the spindle (15), wherein the spindle (15) has a stop (21), which interacts with the spindle nut (15), such that the travel of the spindle (15) can be limited.

13 Claims, 2 Drawing Sheets

Figure 1:
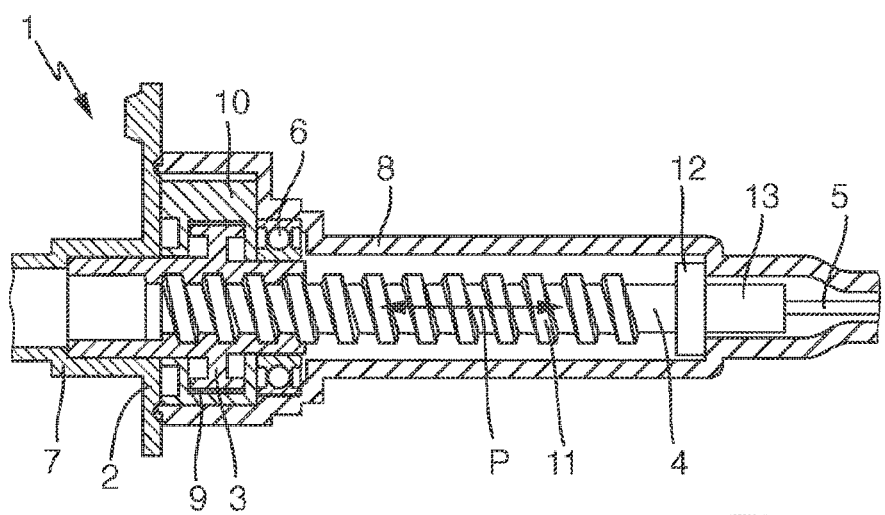

(51) Int. Cl.
  *E05B 81/24*  (2014.01)
  *F16H 25/20*  (2006.01)
  *E05B 15/04*  (2006.01)

(52) U.S. Cl.
  CPC .. *F16H 25/2015* (2013.01); *E05B 2015/0462* (2013.01); *F16H 2025/204* (2013.01)

(56) References Cited

U.S. PATENT DOCUMENTS

| | | | | |
|---|---|---|---|---|
| 6,178,837 | B1* | 1/2001 | Nagai | F16D 55/28 |
| | | | | 74/89.23 |
| 6,655,225 | B1* | 12/2003 | Nagai | F16C 29/008 |
| | | | | 74/89.33 |
| 8,528,948 | B2* | 9/2013 | Bettin | E05B 81/20 |
| | | | | 292/201 |
| 9,541,156 | B2* | 1/2017 | Blumenthal | B60N 2/0232 |
| 2001/0029797 | A1* | 10/2001 | Lange | F16H 25/2015 |
| | | | | 74/89.37 |
| 2003/0188644 | A1* | 10/2003 | Winter | B30B 1/18 |
| | | | | 100/280 |
| 2009/0145182 | A1* | 6/2009 | Bettin | E05B 81/38 |
| | | | | 70/237 |
| 2010/0000354 | A1* | 1/2010 | Shige | F16H 25/2015 |
| | | | | 74/89.23 |
| 2012/0119451 | A1* | 5/2012 | Hangleiter | B23Q 17/003 |
| | | | | 279/126 |
| 2013/0133448 | A1* | 5/2013 | Schroeder | F16H 25/2006 |
| | | | | 74/89.32 |
| 2015/0267440 | A1* | 9/2015 | Topfer | F16C 1/145 |
| | | | | 74/469 |
| 2016/0177602 | A1* | 6/2016 | Graute | E05B 81/32 |
| | | | | 74/424.71 |
| 2017/0114575 | A1* | 4/2017 | Cumbo | E05B 79/20 |
| 2018/0128023 | A1* | 5/2018 | Topfer | E05B 81/25 |
| 2018/0180144 | A1* | 6/2018 | Legrand | F16H 25/2252 |
| 2019/0044409 | A1* | 2/2019 | Matsuto | F16C 19/30 |
| 2019/0316388 | A1* | 10/2019 | Gotzen | E05B 81/06 |
| 2019/0368237 | A1* | 12/2019 | Distefano | F16C 1/12 |

FOREIGN PATENT DOCUMENTS

| | | |
|---|---|---|
| DE | 20 2008 007 310 U1 | 6/2009 |
| DE | 10 2009 028316 A1 | 2/2011 |
| DE | 10 2011 075611 A1 | 11/2012 |
| DE | 10 2012 218 650 A1 | 2/2014 |
| DE | 102012024375 | 6/2014 |
| DE | 20 2013 004785 U1 | 8/2014 |
| EP | 1 451 478 A1 | 9/2004 |
| EP | 2 075 395 A2 | 7/2009 |
| JP | 60-185754 | 12/1985 |
| JP | 3974113 | 9/2007 |
| JP | 2010-025304 | 2/2010 |
| WO | 03/050426 A1 | 6/2003 |

OTHER PUBLICATIONS

International Search Report and Written Opinion for corresponding Patent Application No. PCT/DE2015/100526 dated Mar. 30, 2016.

* cited by examiner

MOTOR VEHICLE LOCK

The invention relates to an actuator unit with an actuator element, especially a closure drive for a motor vehicle latch, having a drive unit, a housing, a spindle nut and a spindle, whereby the spindle nut is accommodated in the housing of the actuator unit and a Bowden cable, whereby the Bowden cable is connected to the spindle.

Motor vehicles are increasingly equipped with technical functions which facilitate operation of the motor vehicle and/or constitute a convenience function. Consequently, the user experiences user-friendliness and malfunctions, such as an unlocked lateral door, are prevented. A convenience function is that the lateral doors are automatically closed. Closure occurs when the user only lightly closes the lateral door. Consequently, the lateral door latch only reaches a pre-ratchet position from where the lateral door is automatically closed completely. This facilitates operation for the user to the extent that only small forces are required for complete closure of a motor vehicle door. This can be a particular advantage when on the one hand large doors and/or great sealing pressure oppose the door.

If lateral doors are named here as an example, this shall not apply restrictively, but the actuator unit with the actuator element also relates to other functions in the motor vehicle, such as electromotive closure of a front flap, a tailgate or a sliding door. However, these are in turn also only examples which do not limit the area of application of the actuator unit. Instead, the actuator unit can always be used when forces need to be introduced into a functional unit of a motor vehicle using a Bowden cable.

For example, the actuator unit can be a closure drive for a motor vehicle latch. By means of the closure unit, a not yet completely closed lateral door present in the pre-ratchet can be transferred into a main ratchet. The lateral door is then fully closed in the main ratchet. The closure drive must close the door against the force of the surrounding door seal, whereby according to the size of the door different forces need to be provided by the closure drive.

From DE 20 2008 007 310 U1 a motor vehicle door seal with a locking mechanism and a closure device with an electrical drive has become known, whereby the closure device acts on the locking mechanism of the motor vehicle door latch. Using a lever mechanism which acts directly on the locking mechanism via a closure pawl, the locking mechanism can be transferred from a pre-ratchet to a main ratchet. The lever mechanism used for this purpose, including the closure pawl, is activated via a spindle drive. The spindle nut in turn is moved over the spindle via a motor with a downstream gearbox. During closure, the spindle nut executes a forwards movement, whereby the actuator path of the spindle nut is limited by an end position buffer. The end position of the spindle nut is additionally recorded using a position sensor and a stylus. Consequently, the motor or the drive unit can be switched off. In particular upon attainment of the end position of the spindle nut a great abutment force acts on the spindle gear which needs to be absorbed via the housing of the drive unit.

From DE 10 2012 218 650 A1 an actuator unit with an actuator element and a drive for movement of the actuator element and a Bowden cable connected to the actuator element have become known. An actuator unit is described and in particular a closure drive which is in turn equipped with an electrical drive and a spindle drive. The spindle as an actuator element of the closure drive dispenses with the position sensors, such as a microswitch, and proceeds to position detection using a stop against the inside of the housing.

A Bowden cable is connected to the spindle. Consequently, the Bowden cable bore can be activated using the spindle. In particular by resetting of the spindle, which is produced for example by a forwards movement of the spindle, on the one hand the Bowden cable bore is moved out of the drive housing, whereby the spindle proceeds with the stop against the inside of the housing. Stoppage of the stop on the housing is hereby detected by the increased power consumption of the electrical spindle drive being recorded, meaning that the motor can be switched off. Advantageously, the position sensors for recording of the end positions of the spindle can thus be dispensed with. In particular during stoppage of the spindle on the housing a relative force is produced between the spindle and the spindle nut which is absorbed by the housing. A pre-requisite for this is that the spindle nut is accommodated in the housing. Housings for closure drives are constructed of multiple components. Consequently, especially in the spindle nut accommodation area, increased requirements are made to guarantee safe and durable functioning of the closure drives.

A problem arising in the further development of motor vehicle latches and in particular actuator units, such as closure drives for motor vehicle latches is that on the one hand safety in accordance with the requirements needs to be guaranteed, so that the forces to be provided are reproducible and can be provided on a long-term stabilized basis, and on the other hand the automotive industry strives towards making motor vehicles lighter overall.

The task of the invention is to provide an improved actuator unit with an actuator element. Furthermore, it is a task of the invention to provide an actuator unit with an actuator element which on the one hand is executed in a long-term stable manner, which can be executed with the least possible constructional elements and which manages with the least possible stresses on the housing.

The task is solved according to the invention by the characteristics of the independent patent claim 1. Advantageous designs of the invention are stated in the sub-claims. It is pointed out that the execution examples described below are not restrictive; instead, any variations of the characteristics described in the description and the sub-claims are possible.

According to patent claim 1, the task of the invention is solved by an actuator unit with an actuator element, in particular a closure drive for a motor vehicle being provided having a drive unit, a housing, a spindle nut and a spindle, whereby the spindle nut is accommodated in the housing of the actuator unit and a Bowden cable, whereby the Bowden cable is connected to the spindle and whereby the spindle has a stop which interacts with the spindle nut, enabling a path restriction of the spindle. Due to the design of the actuator unit according to the invention, this now creates the possibility of providing an improved actuator unit which constitutes the least possible stresses for the actuator unit housing.

A crucial aspect for this is that, when the end position of the spindle is reached path limitation, is produced by the spindle nut. Consequently, on the one hand, a defined stop is available, so that micro switches can be dispensed with, and on the other hand the relative force is generated between the spindle stop and the spindle nut when the end stop is reached. Path limitation, i.e. the end position of the spindle, is thus attained by the spindle traveling against the spindle nut. Consequently, reaching of the path limitation exerts no force on the actuator unit housing. Accommodating the spindle nut in the housing only has guiding, accommodating and/or stopping functions; however, no relative force is transferred to the housing as a brace between the spindle and spindle nut. The spindle travels against the end stop, the spindle nut according to the invention, so that the spindle nut is blocked and increased power consumption of the electrical drive occurs.

The electrical drive records this increased power consumption without a position sensor or micro switch being necessary and can use this signal of increased power consumption to switch off the motor. It is advantageous here if work can take place with the least possible number of constructional elements, the housing is stressed as little as possible and an execution with long-term stability can thus be provided.

Drives operated with an electromotor and equipped with a spindle nut gearbox, which are preferably used in motor vehicles, are regarded as actuator units. As already stated in the introduction, areas of application can be closure drives, actuators for fold-down headrests or back seat backs, for example. However, actuator units can also be used for example to open a tank flap, a tailgate or a motor hood to state some specific applications as an example. Furthermore, actuator units can also be used to seal compartments or covers.

The actuator unit according to the invention with an actuator element as a closure drive is preferably used for a motor vehicle latch. Conditional upon the production and also the mounting the actuator unit has a dual component housing, for example. The housing can be executed on the one hand to accommodate the motor and the gearbox or the spindle drive and on the other hand to accommodate a housing lid by means of which the actuator unit can be sealed, preferably in a watertight manner. Hereafter, the section of the housing accommodating the motor and the gearbox is described as the accommodating housing and the housing section which seals the housing is described as a housing lid. The actuator unit according to the invention has a spindle nut and a spindle. The spindle nut is accommodated in the housing. The spindle nut is accommodated in the accommodating housing and in the housing lid. The spindle nut is driven by a drive unit which preferably consists of an electromotor with a pinion shaft and a worm gear. The worm gear can hereby act on an external interlinking of the spindle nut. The spindle nut drives the spindle which is accommodated, longitudinally displacable, in the accommodating housing and in the spindle nut.

The spindle nut preferably has an internal thread into which an interlinking of the spindle engages or with which the interlinking interacts on the spindle. The spindle forms the actuator element, whereby a Bowden cable is connected to the spindle frictionally, positively and firmly bonded.

During a movement of the spindle, the spindle nut is braced to transmit a force in the housing. Unilaterally, the spindle, according to the invention has an end stop which becomes adjacent to the spindle nut during a procedure of the spindle from the spindle nut. The spindle nut thus unilaterally forms a stop for the spindle. Consequently, path limitation can be achieved for the spindle using the spindle nut. Advantageously, by means of this stop and in particular during driving out of the spindles in the direction of the accommodating housing section, in which the Bowden cable is moved out of the housing, the housing of the actuator unit is stressed as little as possible.

In an execution form of the invention the stop is formed as a separate stopping means. On the one hand, from the perspective of cost-effective manufacturability of the spindle and on the other hand in order to facilitate mounting which is as cost-effective as possible, it is proposed according to the invention to form the stopping means on the spindle as a separate component. This can be advantageous, for example, if the spindle is equipped with a guide element on the end opposite the stop, for example, whereby the guide element has a greater diameter than the spindle, so that the mounting of the spindle is effected through the spindle nut. It is advantageous that the stop can be selected individually according to the area of application of the actuator unit and stress on the spindle or stop. For large forces, for example, a steel stop can be selected and for lesser forces a stop from a more cost-effective material, such as plastic.

If the separate stopping means is positively connected to the spindle, a further advantageous execution form of the invention results. A positive connection offers the advantage of quick and cost-effective mountability which can also be produced cost-effectively. In a preferred execution form, the separate stopping means is a spring ring, whereby the spring ring is positively held on the spindle. If, for example, a groove is molded into the spindle on the stop-side end of the spindle, a spring ring can thus be mounted into the groove, whereby the spring ring protrudes beyond the groove and can act as a stop for the spindle. A spring ring offers the advantage that these are available in a large number and in a standardized manner and thus cost-effectively. Furthermore, a groove can easily be molded into a spindle. Consequently, a cost-effective solution of the task is provided. Use of a spring ring also enables quick and easy mounting of a stop on the spindle.

A further execution form of the invention is attained when the stop is formed as a single component with the spindle. A single-component formation of the stop with the spindle can be attained, for example, by the spindle being made of plastic and the stop being molded onto the spindle directly during manufacture. If the spindle is made of metal, the mendel-shaped thread of the spindle is screwed in and the stop is simultaneously shaped. An advantage of a single-part formation of the stop with the spindle is that an optimum force line course can be executed from the spindle into the stop. Furthermore, in the case of a single-component formation the stop can also be executed with the lowest possible material expenditure, for example in relation to the length of the spindle. A single-component formation also offers the advantage of work being able to take place with the least possible number of components.

If the spindles and stop are made of plastic, a further design form of the invention results. The spindle and the stop are preferably made of plastic and are manufactured using an injection molding procedure. This allows cost-effective production and at the same time the possibility of also manufacturing costly constructional designs of the spindle and the stop in a cost-effective manner and in large quantities. Furthermore, a large number of plastics are available which can be selected according to the requirements of the actuator unit. At high stresses, high-strength plastics can be used and for lesser forces on the spindle work can take place with cost-effective plastics.

If the stop has a cushioning and/or attenuating element, a further execution form of the invention results, whereby this acts between the stop and the spindle nut by means of the cushioning and/or attenuating element. Consequently, springing and/or attenuated stop behavior can be executed. The stop acts directly on the spindle nut. If a cushioning and/or attenuating element is now inserted between the stop and the spindle nut, noises produced during stopping of the stop, for example, can thus be minimized and/or eliminated. If the stopping means is a spring ring, for example, which is held in a groove, thus, a spring disk can be inserted into the groove between the spring ring and the spindle nut. Consequently, the spindle first encounters the spring disk when driving out from the spindle nut and before stopping of the stop on the spindle nut, thus enabling execution of a cushioning stop. However, it is also conceivable that in one execution form the stop and the spindle are formed as a single component and an attenuating plastic, which is rubber elastic for example, was applied to the stop. Consequently, the rubber-elastic plastic acts between the stop and the spindle nut. An attenuated stop behavior cold then be achieved hereby. However, for example, a rubber-elastic plastic ring could be inserted between the stop and the spindle nut which then has an attenuating effect between the stop and the spindle nut.

In one execution form of the invention, the spindle nut is accommodated in the housing using a bearing, in particular a ball bearing. The accommodation of the spindle nut in the accommodating housing offers the advantage of accurate, safe and play-free accommodation of the spindle nuts. The ball bearing can also act as a thrust bearing, especially if a tensile stress acts on the spindle, for example in the case in which forces are initiated via the Bowden cable into a lateral door latch, for example. The bearing then acts between the spindle nut and the accommodating housing, whereby the bracing force initiated into the spindle nut via the spindle can be transmitted to the bearing and ultimately to the accommodating housing.

Contrary to the known state of the art in which the spindle stop acts against the accommodating housing, according to the invention the end stop of the spindle is attained when driving out the spindle in such a way that the spindle stop acts against the spindle nut. In this case, only a relative force acts between the stop and the spindle nut and no force is exerted on the housing lid. According to the state of the art, the spindle was braced via the stop on the accommodating housing. Consequently, the spindle nut was pressed against the housing lid as an abutment.

This is circumvented by the design of the stop according to the invention which acts against the spindle nut. Consequently, only a relative movement arises between the spindle and the spindle nut, whereby on the one hand the spindle nut is limited in its movement which leads to an increased power increase in the electromotor drive, whereby the increase in power supply can act as a signal to switch off the electrical drive. The functionality of the actuator unit is thus guaranteed. However, the force transmission through the spindle into the housing is improved. Consequently, lower requirements can be placed on the tightness between the housing lid and the accommodating housing, for example, which has another positive impact on the construction and finally on the manufacturing costs.

If the spindle has a guide element on an end opposite the stop, whereby the guide element interacts with the housing, a further advantageous design of the invention thus results. The guide element can be molded onto the spindle as a single component, for example. The guide element serves to guide the spindle in the housing and can simultaneously serve to accommodate the Bowden cable. A spindle guide can advantageously assist the movement of the spindle in the spindle nut, especially if large forces are initiated via the Bowden cable into the spindle gearbox. The guide element can also be mounted as a separate guide element on the spindle. Consequently, different materials can be selected which have a positive effect on the guide characteristics of the guide element.

If the spindle nut has a depression and the stop can be moved into the spindle nut and stops on the spindle nut, a further execution form of the invention results. The spindle nut preferably has external interlinking by means of which the spindle nut can be driven. The spindle is driven using an internal thread on the spindle nut. If the spindle nut is now equipped with a recess or depression, at least in places, enabling the stop present on the spindle to be driven into the spindle nut, a very compact construction of the actuator unit can thus be attained. In addition to a more compact construction of the actuator unit, optimum material usage can also be attained in the manufacture of the spindle gearbox.

Hereinafter the invention is explained in further detail with reference to the attached drawings on the basis of a preferred execution example. However, the principle applies that the execution example does not restrict the invention, but only constitutes an advantageous execution form. The characteristics portrayed can be executed individually or in combination with other characteristics of the description and also the patent claims individually or in combination.

Figure 2:
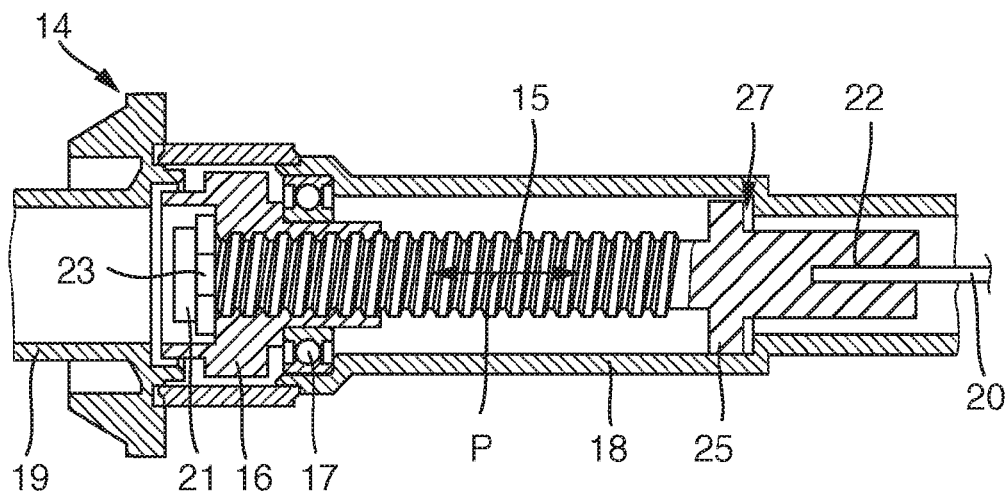
Figure 3:
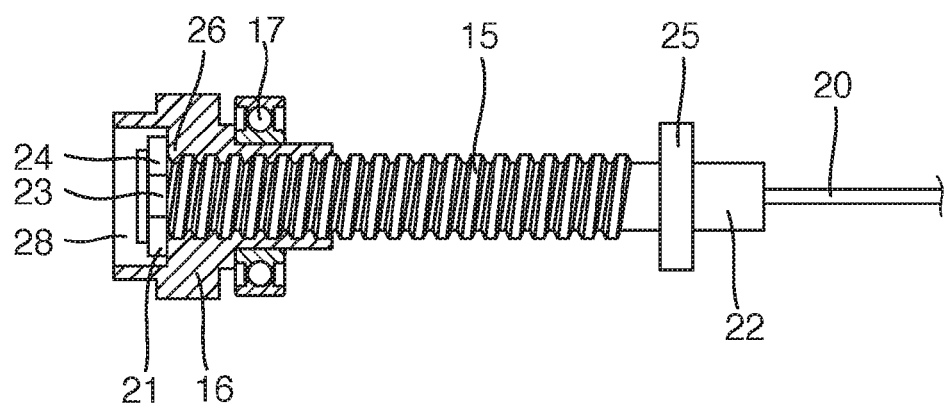

The following are shown:

FIG. 1 A cross-section through the actuator element according to the state of the art in the area of the spindle drive, whereby the cut is made through the spindle nut, the spindle and the Bowden cable, FIG. 2 An actuator element executed according to the invention which is also illustrated in the cross-section in the area of the spindle or spindle nut, and FIG. 3 a separate view onto a spindle formed according to the invention, a spindle nut and accommodation for the spindle nut as separate components detached from the actuator element.

In FIG. 1 an actuator unit 1 is depicted according to the state of the art, as known from DE 10 2012 218 650 A1, for example.

The actuator unit 1 has a housing 2, a spindle nut 3, a spindle 4, a Bowden cable 5, and a bearing 6. The housing 2 is formed from the housing lid 7 and the housing 8 accommodating the drive elements. The spindle nut 3 is pivotably accommodated unilaterally in the bearing 6 and on the opposite side in the housing lid 7. The spindle nut 3 encompasses an interlinking 9 into which only an implied worm gear 10 of a drive motor can engage.

The spindle 4 is equipped with a helical interlinking 11. Consequently, during a rotational movement of the spindle nut 3 the spindle can be moved backwards and forwards in the direction of the arrow P. The completely extended state of the spindle 4 from the spindle nut 3 is illustrated, whereby a radially extensive cylindrical extension 12 serves as a stop on the housing 8. The spindle 4 lies unilaterally with the extension 12 on the accommodating housing 8, whereby the spindle nut 3 is braced on the housing lid 7. In this completely extended position of the spindle 4 from the spindle nut 3 a relative force acts between the accommodating housing 8 and the housing lid 7. In this execution example, the Bowden cable 5 is connected to the spindle 4 in the area 13.

In FIG. 2 an actuator unit 14 according to the invention is reproduced in profile and in the area of the actuator element 15. The actuator unit has a spindle nut 16, a spindle 15, which simultaneously forms the actuator element, a bearing 17, an accommodating housing 18, a housing lid 19 and a Bowden cable 20. The spindle 15 can be moved backwards and forwards in the direction of the arrow P and by means of the spindle nut 16 and a preferably electrical drive. The completely extended position of the spindle 15 is illustrated. Consequently, a stopping means 21 becomes adjacent on the spindle nut 16. Extended hereby means that the spindle 15 is located in the position illustrated in FIG. 2. The Bowden cable 20, which is firmly connected to the spindle 15 in the connection area 22 was completely moved out of the actuator unit 14.

The spindle 15 has a groove in which in this execution example a spring ring was inserted as a stop 21. On an end of the spindle 15 opposite the stop 21 a guide element 25 is provided which guides the spindle 15 in the accommodating housing section 18.

If the spindle 15 is moved into the spindle nut by means of a rotational movement of the spindle nut 16, the stop 21 is distanced from the spindle nut 16. In this case, the Bowden cable 20 is pulled into the actuator unit 14. The spindle nut 16 is braced on the bearing 17 and thus on the housing 18. If the Bowden cable 20 is now moved out of the actuator unit 14, the stop 21 thus becomes adjacent to a ring-shaped elevation of the spindle nut 16. In this execution form, the spring ring 24 becomes adjacent to the ring-shaped elevation. The spindle 15 cannot be moved further. Consequently, the rotational movement of the spindle nut 16 is braked by the spindle 15 or the stop 21. The increased power consumption arising of the drive can be used as a signal to switch off the, preferably electromotoric, drive.

Of significance for the invention is the fact that no relative force occurs between the spindle nut 16 and the housing 18, 19 of the actuator unit 14. A relative force is present between the stop 21 and the spindle nut 16. The housing is thus stressed as little as possible. The guide element 25 guides the spindle 15 in the accommodating housing 18, but does not become adjacent on the housing 18. A gap 27 remains between the guide element 25 and the accommodating housing 18.

The execution form according to FIGS. 2 and 3 of the invention show that the stop 21 becomes adjacent in a depression 28 of the spindle nut 16 to the spindle nut 16, whereby the installation space of the actuator unit 14 can be advantageously reduced further.

The spindle 15 is a helical-shaped thread and is equipped with a preferably ring-shaped guide element 25 in the cylindrical connection area 22 of the Bowden cable 20. The guide element is preferably formed as a single component with the spindle 15. It is also preferable if the spindle 15 is made of plastic, whereby the Bowden cable 20 can be connected, for example, in an injection molding procedure onto the spindle 15.

REFERENCE SIGN LIST

1 Actuator unit
2 Housing
3 Spindle nut
4 Spindle
5 Bowden cable
6 Bearing
7 Housing lid
8 Accommodating housing
9 Interlinking
10 Worm gear
11 Helical interlinking
12 Extension
13 Connection area of the Bowden cable
14 Actuator unit
15 Actuator element, spindle
16 Spindle nut
17 Bearing
18 Accommodating housing
19 Housing lid
20 Bowden cable
21 Stop
22 Connection area
23 Groove
24 Spring ring
25 Guide element
26 Ring-shaped elevation
27 Gap
28 Depression
P Direction of movement of the spindle

The invention claimed is:

1. An actuator unit having a closure drive for a motor vehicle latch, the actuator unit comprising:
a drive unit,
a housing,
a spindle nut pivotably accommodated at a fixed axial position in the housing,
a spindle that is configured to move axially through the housing via rotation of the spindle nut, and
a Bowden cable, wherein the Bowden cable is connected to the spindle, wherein the spindle has a stop which interacts with the spindle nut, so that it is possible to limit the path of the spindle, wherein the stop is formed as a separate spring ring that is secured to the spindle in a form-fitting manner for axial movement with the spindle.

2. The actuator unit according to claim 1, wherein the spindle and the stop are made of plastic.

3. The actuator unit according to claim 1, wherein the stop has a cushioning and/or attenuating element, whereby by means of the cushioning and/or attenuating element action takes place between the stop and the spindle nut, so that a cushioned and/or attenuated stop behavior can be achieved.

4. The actuator according to claim 1, wherein the spindle nut is accommodated in the housing using a ball bearing.

5. The actuator unit according to claim 1, wherein the spindle has a guide element at an end opposite the stop, whereby the guide element interacts with the housing.

6. The actuator unit according to claim 1, wherein the spindle nut has a first depression and the stop can be moved into the spindle nut, and become adjacent to a second depression on the spindle nut.

7. The actuator unit according to claim 1, wherein the spindle has a continuous helical-shaped thread extending along most of an axial length of the spindle.

8. The actuator unit according to claim 1, wherein the spindle is configured to axially move as a unitary body.

9. The actuator unit according to claim 1, wherein the housing is formed to enclose the spindle during movement of the spindle.

10. The actuator unit according to claim 1, wherein the spindle has a radial guide element at an end opposite the stop, and wherein the spindle has a continuous helical-shaped thread extending from the stop to the radial guide element.

11. The actuator unit according to claim 1, wherein the spindle nut has a depression in which the stop is received.

12. The actuator unit according to claim 1, wherein the spindle has a molded groove in which the spring ring is inserted.

13. The actuator unit according to claim 1, wherein the spindle has a guide element formed at an opposite end of the spindle relative to the stop, wherein when the stop is engaged against the nut, an axial gap is defined between the guide element and the housing at the opposite end of the spindle.

\* \* \* \* \*